(12) United States Patent
Chen

(10) Patent No.: US 9,974,026 B2
(45) Date of Patent: May 15, 2018

(54) TERMINAL CONTROL METHOD AND TERMINAL

(71) Applicant: Huawei Technologies Co., Ltd., Shenzhen (CN)

(72) Inventor: Lei Chen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days. days.

(21) Appl. No.: 15/544,823

(22) PCT Filed: Jan. 20, 2015

(86) PCT No.: PCT/CN2015/071121
§ 371 (c)(1),
(2) Date: Jul. 19, 2017

(87) PCT Pub. No.: WO2016/115682
PCT Pub. Date: Jul. 28, 2016

(65) Prior Publication Data
US 2018/0007632 A1   Jan. 4, 2018

(51) Int. Cl.
*H04W 52/02* (2009.01)
*H04B 1/38* (2015.01)
(Continued)

(52) U.S. Cl.
CPC ...... *H04W 52/0254* (2013.01); *H04B 1/3888* (2013.01); *H04M 1/0202* (2013.01); *H04M 2250/12* (2013.01)

(58) Field of Classification Search
CPC ............ H04W 52/0254; H04W 52/027; H04B 1/3888; H04M 1/0202; H04M 2250/12;
(Continued)

(56) References Cited

U.S. PATENT DOCUMENTS

2008/0165022 A1* 7/2008 Herz ................. G06F 3/017
340/669
2012/0139877 A1* 6/2012 Kawabe ............ G06F 1/1643
345/175
(Continued)

FOREIGN PATENT DOCUMENTS

CN            1694362 A    11/2005
CN          102520852 A     6/2012
(Continued)

*Primary Examiner* — Pablo Tran
(74) *Attorney, Agent, or Firm* — Slater Matsil, LLP

(57) ABSTRACT

The present invention provides a terminal control method and a terminal, and relates to the field of electronic devices. The method includes when a magnetic field sensed by a Hall device of a terminal in a standby state is less than or equal to a first preset threshold, activating a sensor of the terminal, where the Hall device is configured to sense a magnetic field generated by a magnet in a protective case of the terminal. The method also includes obtaining, by using detection data of the sensor, whether the terminal is obstructed, and maintaining the standby state of the terminal when it is obtained that the terminal is obstructed. The method and the terminal provided in the present invention are applied to the terminal.

16 Claims, 3 Drawing Sheets

(51) Int. Cl.
*H04M 1/02* (2006.01)
*H04B 1/3888* (2015.01)
(58) Field of Classification Search
CPC ... H04M 1/72569; H04M 1/22; G06F 1/1684; G06F 1/3231; G06F 1/3265; G09G 3/3406; G09G 3/34; Y02B 60/1242; Y02B 60/1289; Y02B 60/50
See application file for complete search history.

(56) References Cited

U.S. PATENT DOCUMENTS

| | | |
|---|---|---|
| 2013/0229442 A1* | 9/2013 | Yang ................... G06F 1/1684 345/690 |
| 2013/0328825 A1 | 12/2013 | Brown et al. |
| 2014/0043121 A1 | 2/2014 | Sartee et al. |

FOREIGN PATENT DOCUMENTS

| | | |
|---|---|---|
| CN | 102868821 A | 1/2013 |
| CN | 103200291 A | 7/2013 |
| CN | 204069064 U | 12/2014 |
| KR | 20080053026 A | 6/2008 |
| WO | 2012036891 A2 | 3/2012 |

\* cited by examiner

TERMINAL CONTROL METHOD AND TERMINAL

CROSS-REFERENCE TO RELATED APPLICATIONS

This application is a National Stage of International Application No. PCT/CN2015/071121, filed on Jan. 20, 2015, which is hereby incorporated by reference in its entirety.

TECHNICAL FIELD

Embodiments of the present invention relate to the field of electronic devices, and in particular, to a terminal control method and a terminal.

BACKGROUND

With popularity of terminals, a protective case of a terminal is used to not only protect the terminal, but also wake up the terminal when the protective case is turned over, or keep the terminal in a standby state when the protective case is closed.

Specifically, a mobile phone is used as an example. A patch of magnet is built into a side (flip side) of a protective case of the mobile phone, and the side is in contact with a mobile phone screen. A Hall device of the mobile phone senses a magnetic field of the magnet. As shown in FIG. 1, if the protective case of the mobile phone is partially opened, and the magnet is not within a sense range of the Hall device, that is, the Hall device cannot sense the magnetic field of the magnet, the mobile phone is woken up, and the screen is lit up.

However, when the mobile phone is in a rather jolting environment, even though the protective case is not fully opened, a relative position between the magnet of the protective case and the Hall device may change with a jolt. Therefore, the Hall device may be unable to sense the magnetic field of the magnet, and further, the mobile phone is woken up, and the mobile phone screen is lit up, causing a power waste of the mobile phone.

SUMMARY

Embodiments of the present invention provide a terminal control method and a terminal to reduce a case in which a terminal screen is lit up due to a misjudgment, thereby reducing power consumption of the terminal.

To achieve the foregoing objective, the following technical solutions are used in the embodiments of the present invention.

According to a first aspect, a terminal control method is provided, including when a magnetic field sensed by a Hall device of a terminal in a standby state is less than or equal to a first preset threshold, activating a sensor of the terminal, where the Hall device is configured to sense a magnetic field generated by a magnet in a protective case of the terminal. The method also includes obtaining, by using detection data of the sensor, whether the terminal is obstructed and maintaining the standby state of the terminal when it is obtained that the terminal is obstructed.

With reference to the first aspect, in a first possible implementation manner, the method further includes: changing the terminal from the standby state to a working state when it is obtained that the terminal is not obstructed.

With reference to the first possible implementation manner, in a second possible implementation manner, the method further includes: after the changing the terminal from the standby state to a working state, disabling the sensor.

With reference to any one of the first aspect or the first to the second possible implementation manners, in a third possible implementation manner, the obtaining, by using detection data of the sensor, whether the terminal is obstructed includes: obtaining, by using the sensor, a distance between a flip side of the protective case of the terminal and the sensor; and when the distance is less than or equal to a second preset threshold, obtaining that the terminal is obstructed; or when the distance is greater than the second preset threshold, obtaining that the terminal is not obstructed.

With reference to any one of the first aspect or the first to the third possible implementation manners, in a fourth possible implementation manner, the method further includes: after the sensor is activated, performing, by the sensor, periodic detection to obtain periodic detection data.

With reference to any one of the first aspect or the first to the fourth possible implementation manners, in the third possible implementation manner, the sensor is a proximity sensor.

With reference to the third possible implementation manner, in a sixth possible implementation manner, the second preset threshold is 1 to 2 centimeters.

According to a second aspect, a terminal is provided, including a processor, a Hall device, and a sensor, where the Hall device is configured to sense a magnetic field generated by a magnet in a protective case of the terminal. Also, when the terminal is in a standby state and the sensed magnetic field is less than or equal to a first preset threshold, activate the processor. The processor is configured to, after being activated by the Hall device, activate the sensor and obtain, by using detection data of the sensor, whether the terminal is obstructed. The processor is further configured to maintain the standby state of the terminal when obtaining that the terminal is obstructed.

With reference to the second aspect, in a first possible implementation manner, the processor is further configured to change the terminal from the standby state to a working state when obtaining that the terminal is not obstructed.

With reference to the second aspect, in a second possible implementation manner, the processor is further configured to disable the sensor after changing the terminal from the standby state to the working state.

With reference to any one of the second aspect or the first to the second possible implementation manners, in a third possible implementation manner, when obtaining, by using the detection data of the sensor, whether the terminal is obstructed, the processor is specifically configured to: obtain, by using the sensor, a distance between a flip side of the protective case of the terminal and the sensor; and when the distance is less than or equal to a second preset threshold, obtain that the terminal is obstructed; or when the distance is greater than the second preset threshold, obtain that the terminal is not obstructed.

With reference to any one of the second aspect or the first to the third possible implementation manners, in a fourth possible implementation manner, the sensor is further configured to: after being activated, perform periodic detection to obtain periodic detection data.

With reference to any one of the second aspect or the first to the fourth possible implementation manners, the sensor is a proximity sensor.

With reference to the third possible implementation manner, in a sixth possible implementation manner, the second preset threshold is 1 to 2 centimeters.

According to the terminal control method and the terminal provided in the embodiments of the present invention, the terminal determines a terminal state by using detection data of two components: a Hall device and a sensor. In this way, the terminal can determine, according to strength of a sensed magnetic field and whether the terminal is obstructed, whether the terminal continues to keep in a standby state, which reduces a case in which the terminal enters a working state due to a misjudgment, thereby reducing power consumption of the terminal.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 2:
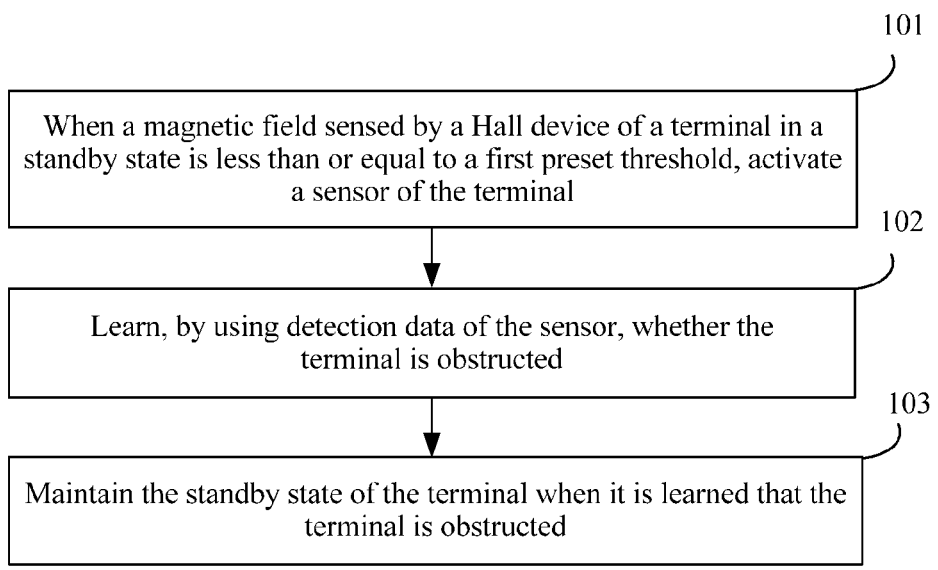
FIG. 2 is a flowchart of a terminal control method according to an embodiment of the present invention.

This embodiment of the present invention provides a terminal control method, applied to a terminal. The terminal in each embodiment of the present invention may be a mobile phone, a tablet computer, a notebook computer, a UMPC (Ultra-mobile Personal Computer), a netbook, a PDA (Personal Digital Assistant), or the like. These terminals may include a Hall device, a sensor, and the like. As shown in FIG. 2, the method provided in this embodiment may include the following steps.

Step 101: When a magnetic field sensed by a Hall device of a terminal in a standby state is less than or equal to a first preset threshold, activate a sensor of the terminal, where the Hall device is configured to sense a magnetic field generated by a magnet in a protective case of the terminal.

The terminal in each embodiment of the present invention may be used in collaboration with a protective case. The terminal is located in the protective case when in use. A flip side of the protective case can be turned over. When the flip side is closed, that is, when the flip side covers a front side of the terminal, the terminal may stay in a standby state; when the flip side is opened, that is, when the flip side keeps away from the front side of the terminal, the terminal may stay in a working state.

The flip side of the protective case contains a magnet. When the flip side is fully closed, the magnetic field sensed by the Hall device of the terminal is greater than the first preset threshold. Therefore, when the magnetic field sensed by the Hall device of the terminal is greater than the first preset threshold, it indicates that the protective case is closed in this case, and the terminal stays in the standby state. When the magnetic field sensed by the Hall device of the terminal in the standby state is less than or equal to the first preset threshold, it is possible that the flip side is opened; or it is possible that the flip side is not opened, but due to an external force, the flip side is partially opened or the flip side does not fully cover the front side of the terminal. For example, a case in which the flip side does not fully cover the front side of the terminal may be as follows: Due to the external force, the flip side changes in shape or rotates, and therefore, the flip side is not fully closed and does not fully cover the front side of the terminal.

When the magnetic field sensed by the Hall device of the terminal in the standby state is less than or equal to the first preset threshold, it does not necessarily indicate that the flip side is opened. Therefore, in the method provided in this embodiment, when the magnetic field sensed by the Hall device of the terminal in the standby state is less than or equal to the first preset threshold, the sensor of the terminal is activated to further determine whether the flip side is opened.

Specifically, the Hall device may activate the sensor of the terminal in the following manner: When the magnetic field sensed by the Hall device is less than or equal to the first preset threshold, the Hall device activates a processor of the terminal, and then the processor activates the sensor of the terminal.

Figure 1:
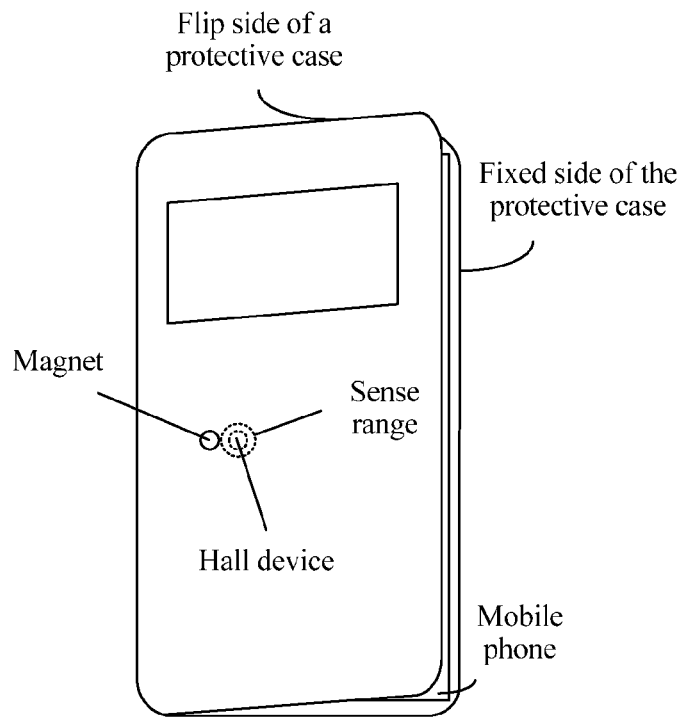
FIG. 1 is a schematic diagram of a protective case of a mobile phone in the prior art.

A Hall device of a different model may activate the processor in a different manner. For example, some Hall devices may activate the processor by using an output high voltage, and some Hall devices may send an activate instruction to the processor, so as to activate the processor. A method for activating the processor by the Hall device is not limited in this embodiment. In this embodiment, only activating the processor by using an output high voltage is used as an example for description. When a relative position between the terminal and the protective case changes, a change of the relative position may lead to a fact that the magnet shown in FIG. 1 may go beyond a sense range of the Hall device (that is, the magnetic field sensed by the Hall device is less than or equal to the first preset threshold). The Hall device sends the output high voltage to one pin of the processor, and the high voltage activates the processor. In this case, except a touchscreen and a touch sensor, all other devices can operate normally.

Further, that the processor activates the sensor may include the following: After the Hall device activates the processor, the processor starts to scan each component (such as the Hall device) of the terminal and obtains data of each component, where the data of each component includes a detection result of the Hall device. The detection result represents whether the magnetic field sensed by the Hall device is less than or equal to the first preset threshold. If the sensed magnetic field is less than or equal to the first preset threshold, the processor activates the sensor.

Step 102: Obtain, by using detection data of the sensor, whether the terminal is obstructed.

In this embodiment, any sensor that can sense an obstruction can be used as the sensor of this embodiment, such as a photosensitive sensor for detecting light intensity and a proximity sensor for detecting a distance.

The proximity sensor is used as an example to describe step 102. The terminal obtains a distance between the flip side of the protective case of the terminal and the proximity sensor by using the proximity sensor; and when the distance is less than or equal to a second preset threshold, obtains that the terminal is obstructed; or when the distance is greater than a second preset threshold, obtains that the terminal is not obstructed. The second preset threshold of this embodiment may be 1 centimeter, 2 centimeters, or any value between 1 and 2 centimeters.

Further, before step 102, the method may further include: After being activated, the proximity sensor detects the distance between the flip side of the protective case and the proximity sensor to obtain corresponding detection data, where the detection period cannot be excessively long, and the detection period may be selected from 0.5 to 1 second.

Figure 3:
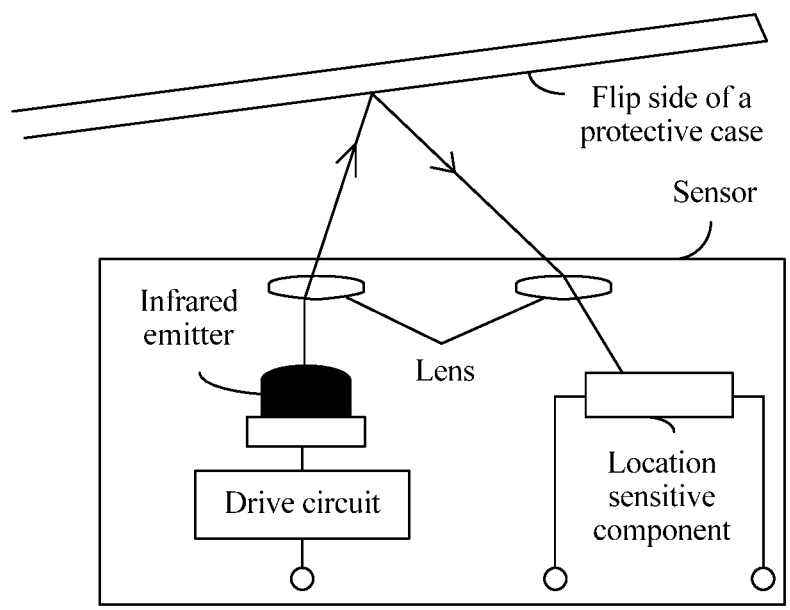
FIG. 3 is a schematic diagram of a proximity sensor in the prior art.
Figure 4:
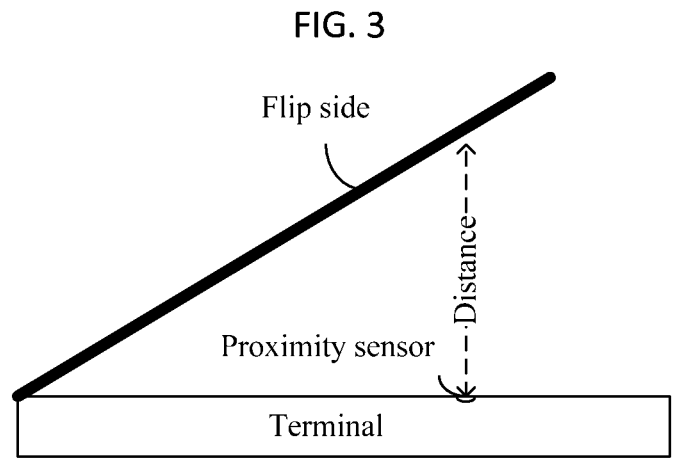
FIG. 4 is a schematic diagram of a relative position between a flip side of a protective case and a terminal according to an embodiment of the present invention.

Specifically, that the proximity sensor detects the distance between the flip side of the protective case and the sensor may include: A proximity sensor shown in FIG. 3 includes an infrared emitter, a lens, a drive circuit, a location sensitive component, where the location sensitive component is a photoelectric device that can directly detect a flare location on a photosensitive surface of the component. FIG. 4 is a sectional drawing of a terminal accommodated in a protective case. The distance between the proximity sensor and the flip side is denoted by a dashed line in FIG. 4. After the proximity sensor is activated, the drive circuit starts to work and drive the infrared emitter to transmit an infrared ray. The infrared ray is refracted by the lens, and refracted infrared ray is transmitted outward. After encountering an obstruction (the flip side), the infrared ray is reflected back, and reflected infrared ray is refracted again by the lens and radiates on the location sensitive component. The location sensitive component generates corresponding resistance according to a location irradiated by the infrared ray, so as to change an amplitude of an output voltage. The processor may obtain the output voltage and determine the distance between the flip side and the sensor according to the amplitude of the output voltage.

It should be noted that when the sensor is a photosensitive sensor, the terminal can determine, according to light intensity sensed by the photosensitive sensor, whether the terminal is obstructed. When the light intensity sensed by the photosensitive sensor is less than a preset value, it indicates that the terminal is not obstructed.

Step 103: Maintain the standby state of the terminal when it is obtained that the terminal is obstructed.

When the terminal obtains that the terminal is obstructed, it indicates that the terminal is obstructed in this case because the flip side is partially opened or the flip side does not fully cover the front side of the terminal due to an external force, rather than a user opens the flip side of the protective case (that is, the flip side keeps away from the front side of the terminal). Therefore, the terminal continues to stay in the standby state.

The terminal provided in this embodiment does not determine a terminal state by detecting only a Hall device anymore, but determines the terminal state by using detection data of two components, the Hall device and a sensor. In this way, the terminal can determine, according to strength of a sensed magnetic field and whether the terminal is obstructed, whether the terminal continues to keep in a standby state, which reduces a case in which the terminal enters a working state due to a misjudgment, thereby reducing power consumption of the terminal.

Further, after the distance between the flip side of the protective case of the terminal and the sensor is obtained by using the sensor, the method may further include: changing the terminal from the standby state to the working state when it is obtained that the terminal is not obstructed. The working state is a state in which all components of the terminal can operate after a terminal screen is lit up. In this state, a user can perform an operation on the terminal screen, and the terminal correspondingly processes the operation.

Further, to reduce power consumption, after the changing the terminal from the standby state to the working state when it is obtained that the terminal is not obstructed, the method may further include: disabling the sensor. The screen is always lit up in the working state, that is, the terminal is not obstructed. Therefore, the terminal does not need to obtain the detection data of the sensor anymore, and the sensor does not need to work either.

Embodiment 2

Figure 5:
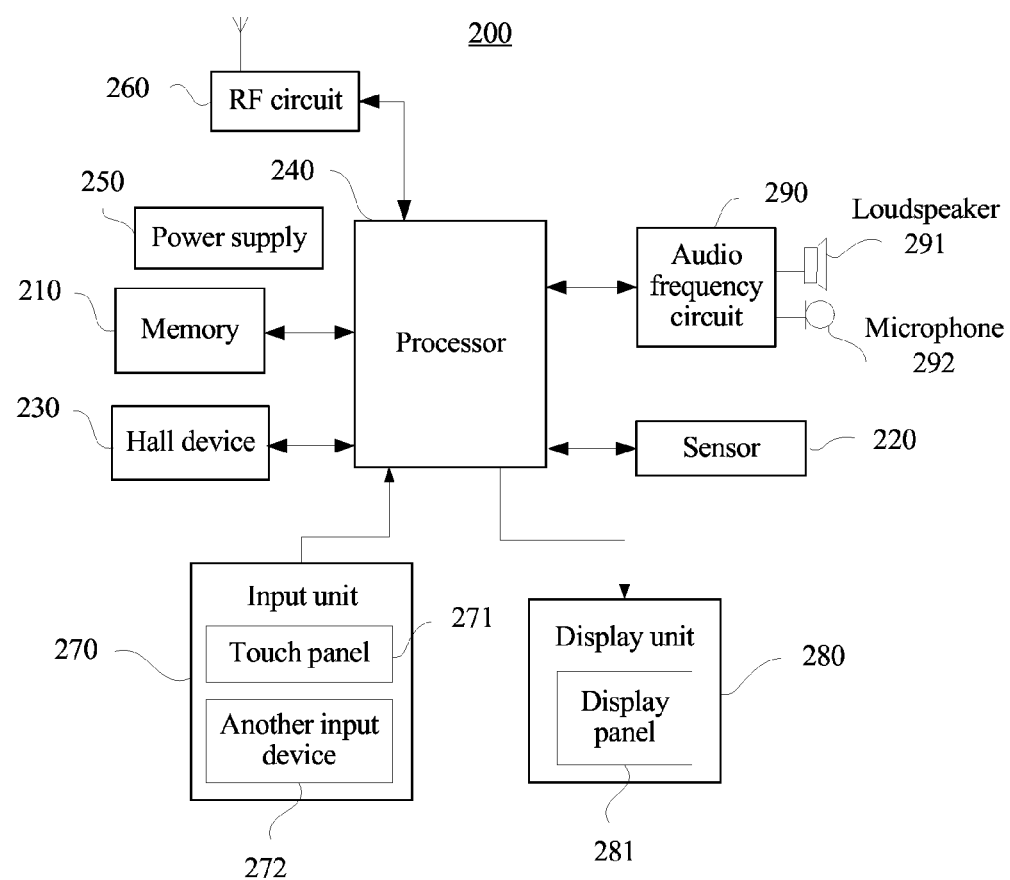
FIG. 5 is a schematic structural diagram of a terminal according to an embodiment of the present invention.

FIG. 5 is a schematic structural diagram of a terminal according to this embodiment of the present invention. The terminal provided in this embodiment of the present invention may be configured to implement the method shown in the foregoing FIG. 2. For ease of description, only a part relevant to this embodiment of the present invention is shown. For specific technical details that are not disclosed, reference may be made to the embodiment shown in FIG. 2.

The terminal may be a terminal device, such as a mobile phone, a tablet computer, a notebook computer, a UMPC, a netbook, or a PDA. In this embodiment of the present invention, an example in which the terminal is a mobile phone is used for description. FIG. 5 shows a block diagram of a partial structure of a mobile phone 200 related to the embodiments of the present invention.

As shown in FIG. 5, the mobile phone 200 includes components such as a memory 210, a sensor 220, a Hall device 230, a processor 240, a power supply 250, an RF (radio frequency, radio frequency) circuit 260, an input unit 270, a display unit 280, and an audio frequency circuit 290. A person skilled in the art may understand that a structure of the mobile phone shown in FIG. 5 constitutes no limitation on the mobile phone, and instead the mobile phone may include components more or fewer than those shown in FIG. 5, or a combination of some components, or different component arrangements.

Each integral part of the mobile phone 200 is described in detail with reference to FIG. 5.

The memory 210 may be configured to store a software program and a module, and the processor 240 runs the software program and the module that are stored in the memory 210, so as to execute various functional applications of the mobile phone 200 and perform data processing. The memory 210 may primarily include a program storage area and a data storage area, where the program storage area may store an operating system, and an application program required by at least one function (such as an audio play function or an image play function), and the like; and the data storage area may store data (such as audio data, image data, or a phonebook) created according to use of the mobile phone 200, and the like. In addition, the memory 210 may include a high-speed random access memory, and may further include a nonvolatile memory, such as at least one magnetic disk storage component, a flash memory component, or another volatile solid-state storage component.

The sensor 220 may sense measured information and convert the sensed information into an electrical signal or information in another required form according to some rules for output, so as to meet requirements of information transmitting, processing, storing, displaying, recording, controlling, and the like. The sensor 220 may be a proximity sensor. The proximity sensor includes components such as an infrared emitter, a lens, a drive circuit, and a location sensitive component, where the location sensitive component is a photoelectric device that can directly detect a flare location on a photosensitive surface of the component.

Other sensors that can be further configured in the mobile phone 200, such as a gyroscope, a barometer, a hygrometer, a thermometer, a gravity sensor, and a photosensitive sensor are not described herein.

The Hall device 230 is a device that senses a magnetic field. An output voltage of the Hall device 230 varies with magnetic field strength. When the magnetic field is stronger, the voltage is higher; and when the magnetic field is weaker, the voltage is lower. Nature of objects detected by the Hall device 230 can be divided into direct application and indirect application according to the object applications. The direct application means that a magnetic field or a magnetic characteristic of a detected object is directly detected; and the indirect application means that a manually configured magnetic field of a detected object is detected, where the magnetic field is used as a carrier of detected information. By using the magnetic field, various non-electric and non-magnetic physical quantities are converted into electric quantities to perform detection and control, such as a force, a moment of force, pressure, a stress, a position, a displacement, a speed, an acceleration, an angle, an angular velocity, a revolution, a rotational speed, and a time at which a working state changes.

The processor 240 is a control center of the mobile phone 200, and uses various interfaces and lines to connect all parts of the entire mobile phone. By running or executing the software program and/or the module stored in the memory 210 and invoking data stored in the memory 210, the processor executes various functions of the mobile phone 200 and processes data so as to perform overall monitoring on the mobile phone. Optionally, the processor 240 may include one or more processing units. For example, an application processor and a modem processor may be integrated into the processor 240, where the application processor mainly processes an operating system, a user interface, an application program, and the like; and the modem processor mainly processes wireless communication. It can be understood that the modem processor may not be integrated into the processor 240.

The mobile phone 200 further includes the power supply 250 (such as a battery) that supplies power to each component. The power supply may be logically connected to the processor 240 by using a power management system, so as to implement functions such as charging, discharging, and power consumption management by using the power management system.

The radio frequency (RF) circuit 260 may be configured to receive and send a signal in an information receiving or sending process or a call process, and in particular, after receiving downlink information from a base station, send the downlink information to the processor 240 for processing; and send uplink data to the base station. Generally, the RF circuit includes but is not limited to an antenna, at least one amplifier, a transceiver, a coupler, an LNA (low noise amplifier), a duplexer, and the like. In addition, the RF circuit 260 may further communicate with a network and another device by means of wireless communication. The wireless communication may use any communications standard or protocol, including but not limited to GSM (Global System for Mobile Communications), GPRS (general packet radio service), CDMA (Code Division Multiple Access), WCDMA (Wideband Code Division Multiple Access), LTE (Long Term Evolution), email, SMS (short message service), and the like.

The input unit 270 may be configured to receive entered digits or character information, and generate key signal input related to user setting and function control of the mobile phone 200. Specifically, the input unit 270 may include a touchscreen 271 and another input device 272. The touchscreen 271 is also referred to as a touch panel and may collect a touch operation on or near the touchscreen (such as an operation performed by a user on or near the touchscreen 271 by using any proper object or accessory, such as a finger or a stylus), and drive a corresponding connection apparatus according to a preset program. Optionally, the touchscreen 271 may include two parts: a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into coordinates of a touch point, then sends the coordinates of the touch point to the processor 240, and can receive and execute a command sent by the processor 240. In addition, the touchscreen 271 may be implemented by using multiple types such as a resistive type, a capacitive type, infrared, and a surface acoustic wave. The input unit 270 may include the another input device 272 in addition to the touchscreen 271. Specifically, the another input device 272 may include but is not limited to one or more of a physical keyboard, a function key (such as a volume control key or an on/off key), a trackball, a mouse, a joystick, or the like.

The display unit 280 may be configured to display information entered by the user or information provided for the user, and various menus of the mobile phone 200. The display unit 280 may include a display panel 281, and optionally, the display panel 271 may be configured in a form of an LCD (Liquid Crystal Display), an OLED (Organic Light-Emitting Diode), or the like. Further, the touchscreen 271 may cover the display panel 281. After detecting a touch operation on or near the touchscreen 271, the touchscreen 271 transfers the touch operation to the processor 240 to determine a type of a touch event, and then the processor 240 provides corresponding visual output on the display panel 281 according to the type of the touch event. In FIG. 5, the touchscreen 271 and the display panel 281 are used as two independent components to implement input and input functions of the mobile phone 200. However, in some embodiments, the touchscreen 271 and the display panel 281 may be integrated to implement the input and output functions of the mobile phone 200.

The audio frequency circuit 290, a loudspeaker 291, and a microphone 292 may provide audio interfaces between the user and the mobile phone 200. The audio frequency circuit 290 may transmit an electrical signal to the loudspeaker 291, where the electrical signal is a result of converting received audio data, and the loudspeaker 291 converts the electrical signal into a sound signal for outputting. In another aspect, the microphone 292 converts a collected sound signal into an electrical signal; and after receiving the electrical signal, the audio frequency circuit 290 converts the electrical signal into audio data and further outputs the audio data to the RF circuit 260, so as to send the audio data to, for example, another mobile phone; or transmits the audio data to the memory 210 for further processing.

Although not shown in the figure, the mobile phone 200 may further include a WiFi (Wireless Fidelity) module, a Bluetooth module, a gravity sensor, a gyroscope, and the like, which are not described herein.

The mobile phone 200 provided in this embodiment may execute the terminal control method in FIG. 2, and details are as follows:

The Hall device 230 is configured to sense a magnetic field generated by a magnet in a protective case of the mobile phone 200, and is further configured to: when the mobile phone 200 is in a standby state and the sensed magnetic field is less than or equal to a first preset threshold, activate the processor 240.

The processor 240 is configured to: after being activated by the Hall device 230, activate the sensor and obtain, by using detection data of the sensor 220, whether the mobile phone 200 is obstructed.

Specifically, when obtaining, by using the detection data of the sensor, whether the mobile phone 200 is obstructed, the processor 240 is configured to obtain, by using the sensor 220, a distance between a flip side of the protective case of the mobile phone 200 and the sensor; and when the distance is less than or equal to a second preset threshold, obtain that the mobile phone 200 is obstructed; or when the distance is greater than the second preset threshold, obtain that the mobile phone 200 is not obstructed.

The processor 240 is further configured to maintain the standby state of the mobile phone 200 when obtaining that the mobile phone 200 is obstructed.

The terminal provided in this embodiment does not determine a terminal state by detecting only a Hall device anymore, but determines the terminal state by using detection data of two components, the Hall device and a sensor. In this way, the terminal can determine, according to strength of a sensed magnetic field and whether the terminal is obstructed, whether the terminal continues to keep in a standby state, which reduces a case in which the terminal enters a working state due to a misjudgment, thereby reducing power consumption of the terminal.

Further, after the processor 240 obtains, by using the detection data of the sensor 220, whether the mobile phone 200 is obstructed, the processor 240 is further configured to change the mobile phone 200 from the standby state to a working state when obtaining that the mobile phone 200 is not obstructed.

Still further, the processor 240 is further configured to: after changing the mobile phone 200 from the standby state to the working state, disable the sensor.

Furthermore, in this embodiment of the present invention, after the processor 240 activates the sensor 220, the sensor 220 is further configured to perform periodic detection to obtain periodic detection data.

The sensor 220 in this embodiment may be a proximity sensor. The second preset threshold in this embodiment may be 1 to 2 centimeters.

In short, the foregoing descriptions are merely exemplary embodiments of the present invention, but are not intended to limit the protection scope of the present invention. Any modification, equivalent replacement, or improvement made without departing from the spirit and principle of the present invention shall fall within the protection scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
sensing, by a Hall device of a terminal, that a magnetic field is less than or equal to a first preset threshold;
activating a sensor of a terminal, in response to sensing that the magnetic field is less than or equal to the first preset threshold, the sensing performed while the terminal is in a standby state, wherein the Hall device is configured to sense a magnetic field generated by a magnet in a protective case of the terminal; and
maintaining the standby state of the terminal, in response to determining, using detection data of the sensor, that the terminal is obstructed.

2. The method according to claim 1, the method further comprising:
changing the terminal from the standby state to a working state, in response to determining that the terminal is not obstructed.

3. The method according to claim 2, the method further comprising:
disabling the sensor after changing the terminal from the standby state to the working state.

4. The method according to claim 1, further comprising:
determining, using the sensor, a distance between a flip side of the protective case of the terminal and the sensor;
determining that the terminal is obstructed, in response to determining that the distance is less than or equal to a second preset threshold; and
determining that the terminal is not obstructed, in response to determining that the distance is greater than the second preset threshold.

5. The method according to claim 4, wherein the second preset threshold is 1 to 2 centimeters.

6. The method according to claim 4, wherein the sensor is a proximity sensor.

7. The method according to claim 1, further comprising:
performing, by the sensor, periodic detection, to obtain periodic detection data, after the sensor is activated.

8. A terminal, comprising:
a protective case comprising a magnet;
a Hall device, configured to sense a magnetic field generated by the magnet in the protective case; and
a sensor, configured to obtain detection data while activated;
a processor; and
a non-transitory computer readable storage medium storing a program for execution by the processor, the program including instructions to:
activate the sensor, in response to determining that the terminal is in a standby state and that a strength of the sensed magnetic field is less than or equal to a first preset threshold; and maintain the standby state of the terminal in response to determining, using detection data of the sensor, that the terminal is obstructed.

9. The terminal according to claim 8, wherein the instructions further comprise instructions to:
change the terminal from the standby state to a working state, in response to determining that the terminal is not obstructed.

10. The terminal according to claim 9, wherein the instructions further comprise instructions to:
disable the sensor, after changing the terminal from the standby state to the working state.

11. The terminal according to claim 8, wherein the instructions further comprise instructions to:
obtain, using the sensor, a distance between a flip side of the protective case of the terminal and the sensor;
determine that the terminal is obstructed, in response to determining that the distance is less than or equal to a second preset threshold; and
determine that the terminal is not obstructed, in response to determining that the distance is greater than the second preset threshold.

12. The terminal according to claim 11, wherein the second preset threshold is 1 to 2 centimeters.

13. The terminal according to claim 8, wherein the sensor is further configured to perform periodic detection, to determine periodic detection data, after being activated.

14. The terminal according to claim 8, wherein the sensor is a proximity sensor.

15. A terminal, comprising:
a protective case comprising a magnet;
a Hall device, configured to sense a magnetic field generated by the magnet in the protective case; and
a sensor, configured to generate, while activated, detection data indicating whether the terminal is obstructed;
a processor; and
a non-transitory computer readable storage medium storing a program for execution by the processor, the program including instructions to:
disable the sensor, in response to determining that the terminal is in a working state; and
maintain the working state of the terminal in response to determining, using detection data of the sensor, that the terminal is not obstructed.

16. The terminal of claim 15, wherein the sensor is a proximity sensor.

* * * * *